(12) United States Patent
Fujii (10) Patent No.: US 9,760,842 B2
(45) Date of Patent: Sep. 12, 2017

(54) OPERATION TARGET MANAGEMENT APPARATUS AND NON-TRANSITORY COMPUTER READABLE MEDIUM

(71) Applicant: FUJI XEROX Co., Ltd., Minato-ku, Tokyo (JP)

(72) Inventor: Hideo Fujii, Kanagawa (JP)

(73) Assignee: FUJI XEROX CO., LTD, Minato-ku, Tokyo (JP)

( * ) Notice: Subject to any disclaimer, the term of this patent is extended or adjusted under 35 U.S.C. 154(b) by 296 days.

(21) Appl. No.: 14/477,341

(22) Filed: Sep. 4, 2014

(65) Prior Publication Data

US 2015/0199525 A1 Jul. 16, 2015

(30) Foreign Application Priority Data

Jan. 14, 2014 (JP) ................. 2014-004470

(51) Int. Cl.
*G06F 17/30* (2006.01)
*G06Q 10/00* (2012.01)
*G06F 21/60* (2013.01)

(52) U.S. Cl.
CPC ........... *G06Q 10/00* (2013.01); *G06F 21/604* (2013.01); *G06F 2221/2143* (2013.01)

(58) Field of Classification Search
CPC ............................ G06Q 10/00; G06F 21/604
See application file for complete search history.

(56) References Cited

U.S. PATENT DOCUMENTS

| 2002/0055870 A1* | 5/2002 | Thomas | G06Q 10/06 705/7.14 |
| 2007/0143859 A1* | 6/2007 | Ogi | G06F 21/604 726/27 |
| 2007/0266006 A1* | 11/2007 | Buss | G06F 21/6227 |

FOREIGN PATENT DOCUMENTS

| JP | 08-115245 A | 5/1996 |
| JP | 2007-011844 A | 1/2007 |

* cited by examiner

*Primary Examiner* — Leslie Wong
(74) *Attorney, Agent, or Firm* — Sughrue Mion, PLLC (57) ABSTRACT

An operation target management apparatus includes a detector, a determination unit, and a registration unit. The detector detects deletion of a first management-right holder, who has been registered as a person having management rights for an operation target, the management rights being rights to manage plural types of operational right. The determination unit determines, in a case where deletion of the first management-right holder is detected, a second management-right holder, who is to newly have management rights for the operation target from among plural operational-right holders having at least either an operational right or management rights for at least one of the operation target and another operation target associated with the operation target. The registration unit registers the second management-right holder as a person having management rights for the operation target.

19 Claims, 9 Drawing Sheets

| NAME | MANAGEMENT-RIGHT USER LIST | WRITE-RIGHT USER LIST | DELETE-RIGHT USER LIST | READ-RIGHT USER LIST |
|---|---|---|---|---|
| A | (X: 5) | (X: 10, Y: 5, Z: 2) | (X: 4, Y: 6, Z: 3) | (X: 10, Y: 10, Z: 10) |
| B | (X: 2) | (X: 3, Y: 3, Z: 3) | (X: 3, Y: 3, Z: 3) | (X: 10, Y: 10, Z: 12) |
| C | (X: 4) | (X: 5, Y: 5, Z: 5) | (X: 5, Y: 3, Z: 3) | (X: 10, Y: 10, Z: 10) |

FIG. 3

| USER ID | JOB TITLE |
|---|---|
| X | SUBSECTION CHIEF |
| Y | CHIEF |
| Z | SECTION CHIEF |

| NAME | CREATOR | MANAGEMENT-RIGHT USER LIST | WRITE-RIGHT USER LIST | DELETE-RIGHT USER LIST | READ-RIGHT USER LIST | ASSOCIATED APPLICATION |
|---|---|---|---|---|---|---|
| A | Y | (X) | (X) | (X) | (X) | DIFFERENCE DETECTION APPLICATION |
| B | X | (X) | (X) | (X) | (X) | HUMAN RESOURCES DATA MANAGEMENT APPLICATION |
| C | X | (X) | (X) | (X) | (X) | ACCOUNTING APPLICATION |
| D | X | (X) | (X) | (X) | (X) | DIFFERENCE DETECTION APPLICATION |

FIG. 7

| APPLICATION ID | ACCESS POLICY |
|---|---|
| DIFFERENCE DETECTION APPLICATION | - CREATE FOLDER FOR EACH USER, AND ASSIGN USER AS USER HAVING MANAGEMENT RIGHTS, WRITE RIGHT, DELETE RIGHT, AND READ RIGHT FOR FOLDER.<br>- WHEN MANAGEMENT-RIGHT USER IS DELETED, ASSIGN CREATOR AS NEW MANAGEMENT-RIGHT USER OF FOLDER. |
| HUMAN RESOURCES DATA MANAGEMENT APPLICATION | - CREATE FOLDER FOR EACH USER, AND ASSIGN USER AND PERSON IN CHARGE OF HUMAN RESOURCES AS USERS HAVING MANAGEMENT RIGHTS, WRITE RIGHT, DELETE RIGHT, AND READ RIGHT FOR FOLDER.<br>- WHEN MANAGEMENT-RIGHT USER IS DELETED, ASSIGN PERSON IN FULL CHARGE OF HUMAN RESOURCES AS NEW MANAGEMENT-RIGHT USER OF FOLDER. |
| ACCOUNTING APPLICATION | - CREATE FOLDER FOR EACH USER, AND ASSIGN USER AND PERSON IN CHARGE OF ACCOUNTING AS USERS HAVING MANAGEMENT RIGHTS, WRITE RIGHT, DELETE RIGHT, AND READ RIGHT FOR FOLDER.<br>- WHEN MANAGEMENT-RIGHT USER IS DELETED, ASSIGN PERSON IN FULL CHARGE OF ACCOUNTING AS NEW MANAGEMENT-RIGHT USER OF FOLDER. |

FIG. 8

| USER ID | ROLE |
|---|---|
| X | IN CHARGE OF HUMAN RESOURCES AND ACCOUNTING |
| Y | IN FULL CHARGE OF HUMAN RESOURCES |
| Z | IN FULL CHARGE OF ACCOUNTING |

FIG. 10

OPERATION TARGET MANAGEMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-004470 filed Jan. 14, 2014.

BACKGROUND

Technical Field

The present invention relates to an operation target management apparatus and a non-transitory computer readable medium.

SUMMARY

According to an aspect of the invention, there is provided an operation target management apparatus including a detector, a determination unit, and a registration unit. The detector detects deletion of a first management-right holder, who has been registered as a person having management rights for an operation target, the management rights being rights to manage plural types of operational right. The determination unit determines, in a case where deletion of the first management-right holder is detected, a second management-right holder, who is to newly have management rights for the operation target from among plural operational-right holders having at least either an operational right or management rights for at least one of the operation target and another operation target associated with the operation target. The registration unit registers the second management-right holder as a person having management rights for the operation target.

BRIEF DESCRIPTION OF THE DRAWINGS

Exemplary embodiments of the present invention will be described in detail based on the following figures, wherein.

DETAILED DESCRIPTION

In the following, exemplary embodiments of the present invention will be described in detail with reference to the drawings.

First Exemplary Embodiment

In a first exemplary embodiment, for a certain object, in the case where no management-right holder is present any more having management rights for the object, which is an example of an operation target, the management rights for the object are given to a user or a group appropriate for the object by taking, into consideration, access rights of other users and a history of the object's use. Note that, in the following, a description will be made in which objects are folders and management-right holders are users.

Figure 1:
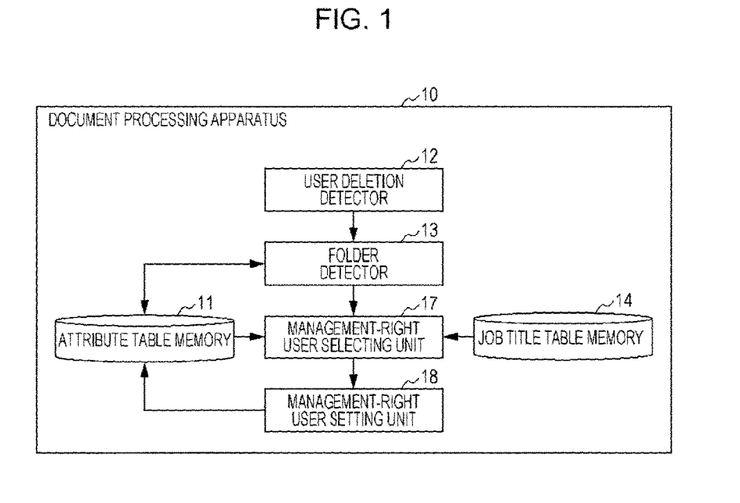
FIG. 1 is a block diagram illustrating an example of a functional configuration of a document processing apparatus according to a first exemplary embodiment of the present invention.

FIG. 1 is a block diagram illustrating an example of a functional configuration of a document processing apparatus 10 according to the first exemplary embodiment. As illustrated in FIG. 1, the document processing apparatus 10 includes an attribute table memory 11, a user deletion detector 12, a folder detector 13, a job title table memory 14, a management-right user selecting unit 17, and a management-right user setting unit 18.

The attribute table memory 11 stores an attribute table that stores attributes of folders. This attribute table will be described in detail later.

The user deletion detector 12 detects deletion of an account of a certain user registered in the document processing apparatus 10. For example, when an account of a certain user is deleted using an input device 96 (see FIG. 10) of the document processing apparatus 10, the user deletion detector 12 detects this operation. Then, the user ID of the user whose account has been deleted is output to the folder detector 13.

The folder detector 13 detects a folder for which no user has management rights (hereinafter referred to as a "management-right user") as a result of deletion of an account of a certain user (such a folder is hereinafter referred to as a "management-right user absence folder"). Specifically, the folder detector 13 deletes information on a user whose account has been deleted from the attribute table stored in the attribute table memory 11, and thus detects a management-right user absence folder, which is a folder for which there is no information on a management-right user, and acquires a folder name of the management-right user absence folder. Then, the folder detector 13 outputs all acquired folder names to the management-right user selecting unit 17.

Note that in the following description, upon deletion of an account of a certain user in this manner, a management-right user absence folder is detected by referring to the attribute table; however, the way in which a management-right user absence folder is detected is not limited to this. It may also be considered that a management-right user absence folder is detected by periodically referring to the attribute table and checking whether or not an account of a certain user has been deleted who is a management-right user of any of the folders. In such a sense, in the first exemplary embodiment, it may be said that the user deletion detector 12 and the folder detector 13 are provided as an example of a detector that detects deletion of a first management-right holder, who has been registered as a person having management rights.

The job title table memory 14 stores a job title table that stores information indicating job titles of users. This job title table will be described in detail later.

For all management-right user absence folders whose folder names have been received by the management-right user selecting unit 17 from the folder detector 13, the management-right user selecting unit 17 selects a new management-right user from among users whose accounts have been registered in the document processing apparatus 10, by referring to the attribute table stored in the attribute table memory 11 and the job title table stored in the job title table memory 14. In the first exemplary embodiment, the management-right user selecting unit 17 is provided as an example of a determination unit that determines a second management-right holder, who is to newly have management rights for an operation target.

The management-right user setting unit 18 sets a management-right user selected by the management-right user selecting unit 17 for a management-right user absence folder. Specifically, information on the selected management-right user is stored in association with the management-right user absence folder in the attribute table stored in the attribute table memory 11. In the first exemplary embodiment, the management-right user setting unit 18 is provided as an example of a registration unit that registers a second management-right holder, who is a person who has management rights for an operation target.

Note that these processing units are realized by software and hardware resources cooperating with each other. Specifically, these processing units are realized by a central processing unit (CPU) 91 (see FIG. 10) loading a program that realizes the user deletion detector 12, the folder detector 13, the management-right user selecting unit 17, and the management-right user setting unit 18 from, for example, a hard disk drive (HDD) 93 (see FIG. 10) into a main memory 92 (see FIG. 10) and executing the program. In addition, the attribute table memory 11 and the job title table memory 14 are realized by, for example, the HDD 93 (see FIG. 10).

Figure 2:
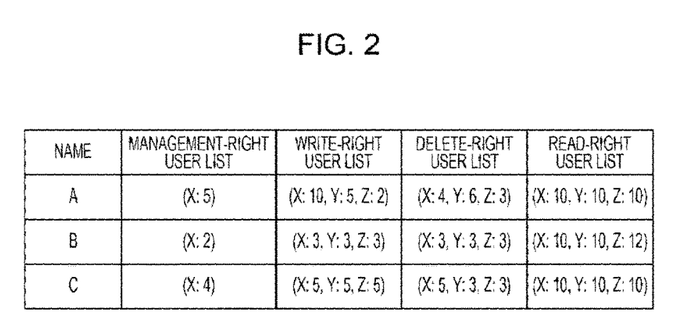
FIG. 2 is a diagram illustrating an example of an attribute table stored in an attribute table memory of the document processing apparatus according to the first exemplary embodiment of the present invention.

FIG. 2 is a diagram illustrating an example of the attribute table stored in the attribute table memory 11 illustrated in FIG. 1. As illustrated in FIG. 2, as attributes of each folder, the attribute table stores a name, a management-right user list, a write-right user list, a delete-right user list, and a read-right user list. Here, a name is a name of a certain folder. A management-right user list is a list of users having management rights, which are rights to change access rights (a write right, a delete right, and a read right) for a certain folder. A write-right user list is a list of users having a write right, which is a right to write to a certain folder. A delete-right user list is a list of users having a delete right, which is a right to delete a certain folder. A read-right user list is a list of users having a read right, which is a right to read a certain folder.

In addition, each user list includes, as attributes, a user ID and the number of times a certain right has been used. Here, the user ID is a user identifier and any one of X, Y, and Z. The number of times a certain right has been used is the number of times a right corresponding to the user list has been used. In the drawing, for example, in the case where a user U having a user ID "U" has used a certain right M times and a user V having a user ID "V" has used the certain right N times, a user list of the users U and V is represented as "(U:M, V:N)". For example, for a folder A, it is indicated that a user X has used management rights 5 times; the user X and users Y and Z have used a write right 10 times, 5 times, and 2 times, respectively; the users X, Y, and Z have used a delete right 4 times, 6 times, and 3 times, respectively; and the users X, Y, and Z have used a read right 10 times, 10 times, and 10 times, respectively.

Figure 3:
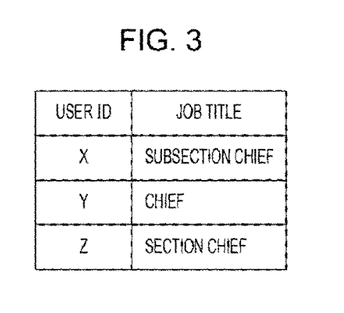
FIG. 3 is a diagram illustrating an example of a job title table stored in a job title table memory of the document processing apparatus according to the first exemplary embodiment of the present invention.

FIG. 3 is a diagram illustrating an example of the job title table stored in the job title table memory 14 illustrated in FIG. 1. As illustrated in FIG. 3, the job title table stores, as attributes, a user ID and a job title. Here, as described above, a user ID is a user identifier and a job title indicates a user's responsibility.

That is, FIG. 3 illustrates that, as job titles, the user X is a subsection chief, the user Y is a chief, and the user Z is a section chief. Note that the job titles are represented by words in FIG. 3; however, the job titles may also be represented by job-title codes assigned to the job titles. For the job titles, levels from high to low are predetermined. In the case where job titles are represented by words or the job titles are represented by job-title codes each of which does not indicate the level of the job title, although not illustrated, information has only to be prestored in which job titles are associated with levels. Alternatively, the job titles may also be represented by job-title codes indicating levels. Here, suppose that the section chief is determined to be at a high level, the subsection chief at an intermediate level, and the chief at a low level.

Next, an operation of the document processing apparatus 10 according to the first exemplary embodiment will be described. Upon detecting deletion of an account of a certain user, the user deletion detector 12 outputs the user ID of the user to the folder detector 13. Then, the folder detector 13 deletes the user ID of the user from each user list of the attribute table. As a result, the folder detector 13 acquires folder names of all management-right user absence folders having no user IDs from the management-right user list, and outputs the folder names to the management-right user selecting unit 17.

Figure 4:
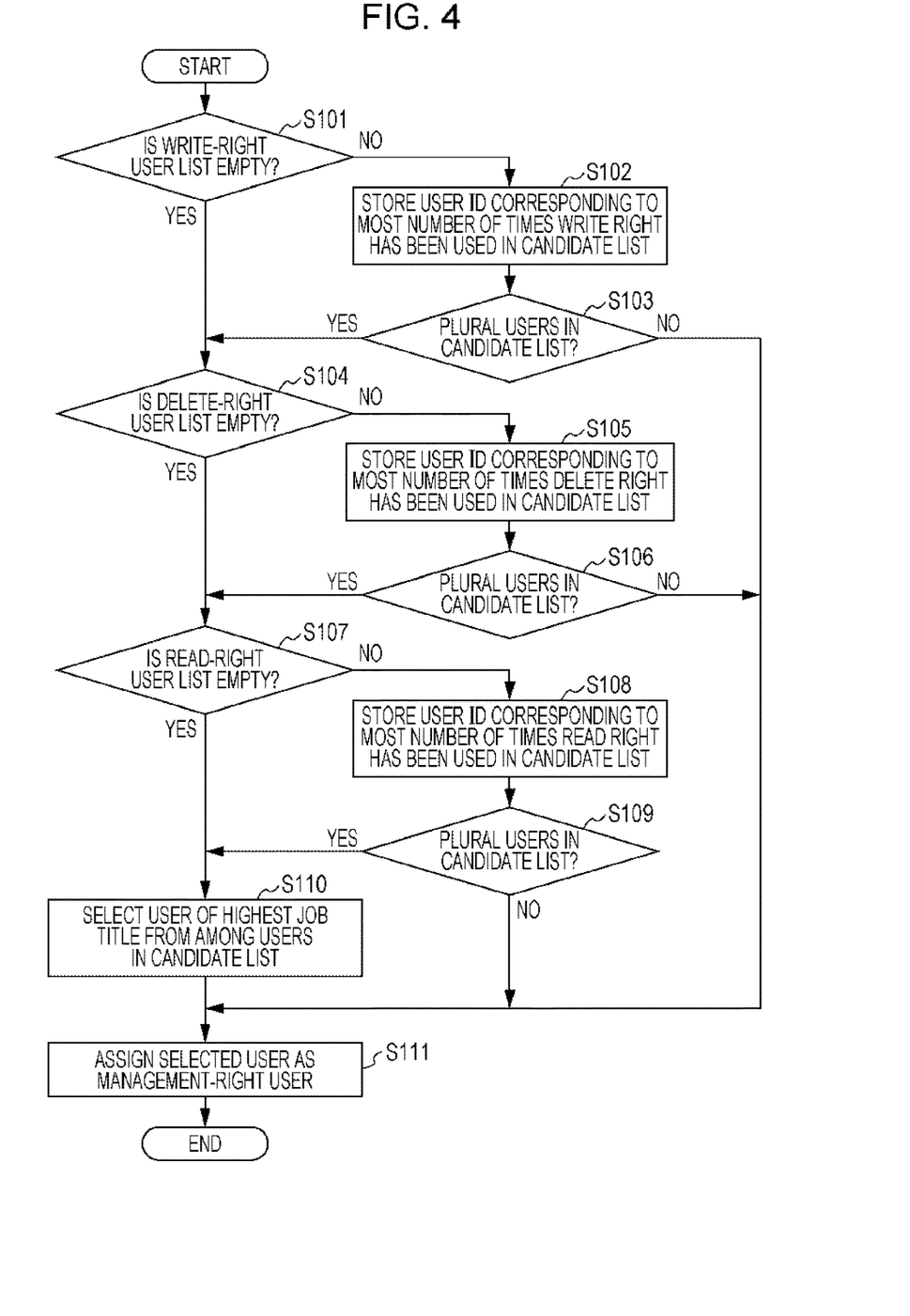
FIG. 4 is a flowchart illustrating an example of an operation of a management-right user selecting unit of the document processing apparatus according to the first exemplary embodiment of the present invention.

Upon receiving the folder names of all the management-right user absence folders from the folder detector 13, the management-right user selecting unit 17 selects a new management-right user for each of the management-right user absence folders. FIG. 4 is a flowchart illustrating an example of an operation of the management-right user selecting unit 17 in this case. That is, the management-right user selecting unit 17 executes an operation illustrated in FIG. 4 for each management-right user absence folder of interest.

As illustrated in FIG. 4, the management-right user selecting unit 17 refers to the attribute table stored in the attribute table memory 11 and determines whether the write-right user list for a folder of interest is empty, that is, whether the write-right user list does not include any user ID (step S101). When it is determined that the write-right user list is not empty, the management-right user selecting unit 17 selects a user ID or IDs corresponding to the most number of times a write right has been used from among user IDs included in the write-right user list, and stores the selected user ID or IDs in a candidate list for a new management-right user (step S102). Then, it is determined whether or not plural user IDs are stored in the candidate list (step S103). Here, when it is determined that plural user IDs are not stored in the candidate list, that is, when it is determined that the user ID of only one user is stored in the candidate list, the management-right user selecting unit 17 sets the user ID stored in the candidate list as the user ID of a new management-right user (step S111). In contrast, when it is determined in step S101 that the write-right user list is empty and when it is determined in step S103 that plural user IDs are stored in the candidate list, the process proceeds to step S104 since the management-right user selecting unit 17 is incapable of specifying one management-right user.

Next, the management-right user selecting unit 17 refers to the attribute table stored in the attribute table memory 11 and determines whether the delete-right user list for the folder of interest is empty, that is, whether the delete-right user list does not include any user ID (step S104). When it is determined that the delete-right user list is not empty, the management-right user selecting unit 17 selects a user ID or IDs corresponding to the most number of times a delete right has been used from among user IDs included in the delete-right user list, and stores the selected user ID or IDs in the candidate list for a new management-right user instead of user IDs stored so far (step S105). Then, it is determined whether or not plural user IDs are stored in the candidate list (step S106). Here, when it is determined that plural user IDs are not stored in the candidate list, that is, when it is determined that the user ID of only one user is stored in the candidate list, the management-right user selecting unit 17 sets the user ID stored in the candidate list as the user ID of a new management-right user (step S111). In contrast, when it is determined in step S104 that the delete-right user list is empty and when it is determined in step S106 that plural user IDs are stored in the candidate list, the process proceeds to step S107 since the management-right user selecting unit 17 is incapable of specifying one management-right user.

Next, the management-right user selecting unit 17 refers to the attribute table stored in the attribute table memory 11 and determines whether the read-right user list for the folder of interest is empty, that is, whether the read-right user list does not include any user ID (step S107). When it is determined that the read-right user list is not empty, the management-right user selecting unit 17 selects a user ID or IDs corresponding to the most number of times a read right has been used from among user IDs included in the read-right user list, and stores the selected user ID or IDs in the candidate list for a new management-right user instead of user IDs stored so far (step S108). Then, it is determined whether or not plural user IDs are stored in the candidate list (step S109). Here, when it is determined that plural user IDs are not stored in the candidate list, that is, when it is determined that the user ID of only one user is stored in the candidate list, the management-right user selecting unit 17 sets the user ID stored in the candidate list as the user ID of a new management-right user (step S111). In contrast, when it is determined in step S107 that the read-right user list is empty and when it is determined in step S109 that plural user IDs are stored in the candidate list, the management-right user selecting unit 17 refers to the job title table stored in the job title table memory 14 and selects the user ID of a user whose job title has been determined to be at the highest level from among plural user IDs stored in the candidate list (step S110). Note that the plural user IDs stored in the candidate list here are the user IDs stored in step S105 in the case where the determination result of step S107 is "Yes" and step S110 has been executed, and the user IDs stored in step S108 in the case where the determination result of step S109 is "Yes" and step S110 has been executed. Thereafter, the management-right user selecting unit 17 sets a user ID selected in step S110 as the user ID of a new management-right user (step S111).

In this manner, when the operation illustrated in FIG. 4 is executed for all the management-right user absence folders, the management-right user selecting unit 17 outputs the user ID of a new management-right user determined for each management-right user absence folder to the management-right user setting unit 18. Then, for each management-right user absence folder of the attribute table illustrated in FIG. 2, the management-right user setting unit 18 stores the user ID of the new management-right user received from the management-right user selecting unit 17.

Here, the above-described operation performed when the user ID of the user X is deleted will be described, in a state in which the attribute table illustrated in FIG. 2 is stored in the attribute table memory 11 and the job title table illustrated in FIG. 3 is stored in the job title table memory 14. In this case, the management-right user of folders A, B, and C is the user X in the attribute table illustrated in FIG. 2 and the folders A, B, and C are management-right user absence folders. Thus, for each of the folders A, B, and C, the operation illustrated in FIG. 4 is executed.

When the operation illustrated in FIG. 4 is executed for the folder A, in step S102, the management-right user selecting unit 17 selects Y as a user ID corresponding to the most number of times a write right has been used from among the user IDs included in the write-right user list, and stores Y in the candidate list. Then, the determination result in step S103 is "No". As a result, the management-right user selecting unit 17 sets Y as the user ID of a new management-right user in step S111.

When the operation illustrated in FIG. 4 is executed for the folder B, the management-right user selecting unit 17 selects Y and Z as user IDs corresponding to the most number of times a write right has been used from among the user IDs included in the write-right user list, and stores Y and Z in a candidate list in step S102. Then, the determination result in step S103 is "Yes". As a result, the management-right user selecting unit 17 selects Y and Z as user IDs corresponding to the most number of times a delete right has been used from among the user IDs included in the delete-right user list, and stores Y and Z in the candidate list in step S105. Then, the determination result in step S106 is "Yes". As a result, the management-right user selecting unit 17 selects Z as a user ID corresponding to the most number of times a read right has been used from among the user IDs included in the read-right user list, and stores Z in the candidate list in step S108. Then, the determination result in step S109 is "No". As a result, the management-right user selecting unit 17 sets Z as the user ID of a new management-right user in step S111.

When the operation illustrated in FIG. 4 is executed for the folder C, the management-right user selecting unit 17 selects Y and Z as user IDs corresponding to the most number of times a write right has been used from among the user IDs included in the write-right user list, and stores Y and Z in a candidate list in step S102. Then, the determination result in step S103 is "Yes". As a result, the management-right user selecting unit 17 selects Y and Z as user IDs corresponding to the most number of times a delete right has been used from among the user IDs included in the delete-right user list, and stores Y and Z in the candidate list in step S105. Then, the determination result in step S106 is "Yes". As a result, the management-right user selecting unit 17 selects Y and Z as user IDs corresponding to the most number of times a read right has been used from among the user IDs included in the read-right user list, and stores Y and Z in the candidate list in step S108. Then, the determination result in step S109 is "Yes". As a result, the management-right user selecting unit 17 selects Z, which is the user ID of a user having a higher job title, from among Y and Z stored in the candidate list in step S110 and sets Z as the user ID of a new management-right user in step S111.

Note that in the first exemplary embodiment, when the management-right user selecting unit 17 determines that the candidate list includes plural user IDs in step S109, a method using users' job titles is employed in step S110 as a method for selecting one user ID from among plural user IDs; however, the method for selecting one user ID from among plural user IDs is not limited to the method using users' job titles. As long as attributes of users are used, a method may be employed using any piece of information such as an employee number, a birth date, the number of years of continuous employment, and the like or a method may also be employed in which some of these pieces of information are used in combination.

In the first exemplary embodiment, a process is not described that is performed in the case where there is no management-right user to be selected on the basis of access rights including a write right, a delete right, and a read right; however, in that case, for example, a process for deleting folders and a process for setting the system administrator as a management-right user have only to be performed. Alternatively, which one of the processes is to be performed may also be selected by a user.

Furthermore, in the first exemplary embodiment, priorities are assigned to access rights and a higher priority is given in the order of a write right, a delete right, and a read right. A write right, a delete right, and a read right are evaluated in this order. However, the order of evaluation is not limited to this. Different priorities may be assigned to access rights and a write right, a delete right, and a read right may be evaluated in an order different from the above-described order. Alternatively, the order in which a write right, a delete right, and a read right are evaluated may be determined by a user and may be changed. In addition, access rights other than a write right, a delete right, and a read right may also be evaluation targets.

Moreover, in the first exemplary embodiment, the management-right user selecting unit 17 selects a management-right user depending on the number of times access rights have been used, in the case where, for a certain folder, there is no difference between access rights in terms of priority. However, the way in which a management-right user is selected is not limited to this. Regardless of whether or not there is a difference between access rights in terms of priority for a certain folder, a management-right user may also be selected depending on the number of times access rights have been used. Note that, in the present specification, a description is made using the number of times a certain access right has been used in this manner; however, information may also be used indicating a history of a certain right's use other than the number of times a certain access right has been used.

Furthermore, in the first exemplary embodiment, a new management-right user has been selected from among users having an access right for a certain management-right user absence folder; however, the way in which a new management-right user is selected is not limited to this. A management-right user for another folder associated with a certain management-right user absence folder (for example, an upper-layer folder) may be assigned as a new management-right user for the certain management-right user absence folder. Alternatively, a new management-right user for a certain management-right user absence folder may also be selected from among users having access rights for another folder associated with the certain management-right user absence folder (for example, an upper-layer folder). In such a sense, it may be said in the first exemplary embodiment that the management-right user selecting unit 17 is provided as an example of a determination unit that determines a second management-right holder from among operational-right holders having at least either operational rights or management rights for at least one of an operation target and other operation targets associated with the operation target.

Second Exemplary Embodiment

In a second exemplary embodiment, a system is considered in which plural applications are operating and rules for giving access rights (access policies) differ from application to application. In such a system, in the second exemplary embodiment, in the case where no management-right holder is present any more having management rights for a certain object, which is an example of an operation target, the management rights for the object are given to a user or a group appropriate for the object in light of these access policies. Note that, in the following, a description will be made in which objects are folders and management-right holders are users. In addition, a description will be made supposing that, as applications, a difference detection application for handling drawing data and detecting differences between old and new versions of drawings, a human resources data management application for handling human resources data, and an accounting application for collecting the sum of costs are operating on the system.

Figure 5:
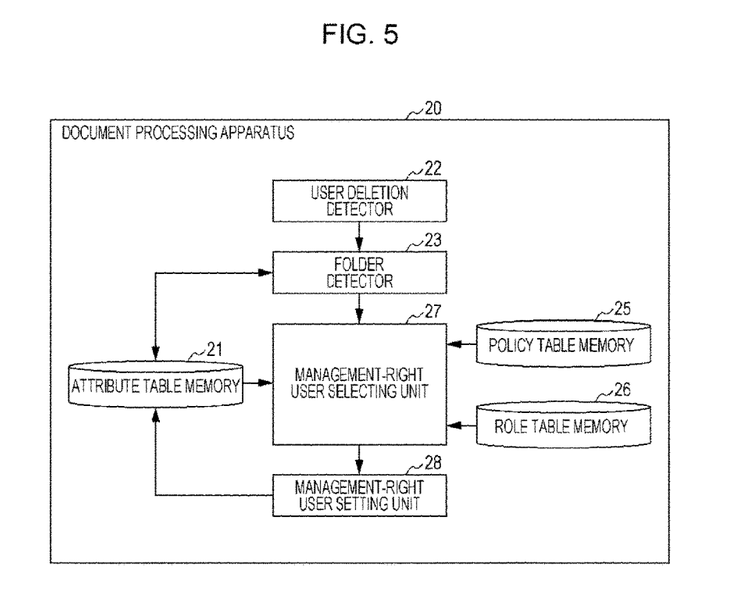
FIG. 5 is a block diagram illustrating an example of a functional configuration of a document processing apparatus according to a second exemplary embodiment of the present invention.

FIG. 5 is a block diagram illustrating an example of a functional configuration of a document processing apparatus 20 according to the second exemplary embodiment. As illustrated in FIG. 5, the document processing apparatus 20 includes an attribute table memory 21, a user deletion detector 22, a folder detector 23, a policy table memory 25, a role table memory 26, a management-right user selecting unit 27, and a management-right user setting unit 28.

The attribute table memory 21 stores an attribute table that stores attributes of folders. This attribute table will be described in detail later.

The user deletion detector 22 and the folder detector 23 have the same function as the user deletion detector 12 and the folder detector 13 according to the first exemplary embodiment, respectively. Thus, the description will be omitted. In the second exemplary embodiment, also, it may be said that the user deletion detector 22 and the folder detector 23 are provided as an example of a detector that detects deletion of a first management-right holder, who has been registered as a person having management rights.

The policy table memory 25 stores a policy table that stores an access policy for each application (a rule for an access right).

The role table memory 26 stores a role table that stores information indicating roles of users. This role table will be described in detail later.

For all management-right user absence folders whose folder names have been received by the management-right user selecting unit 27 from the folder detector 23, the management-right user selecting unit 27 selects a new management-right user from among users whose accounts have been registered in the document processing apparatus 20, by referring to the attribute table stored in the attribute table memory 21, the policy table stored in the policy table memory 25, and the role table stored in the role table memory 26. In the second exemplary embodiment, also, the management-right user selecting unit 27 is provided as an example of a determination unit that determines a second management-right holder, who is to newly have management rights for an operation target.

The management-right user setting unit 28 has the same function as the management-right user setting unit 18 according to the first exemplary embodiment. Thus, the description will be omitted. In the second exemplary embodiment, also, the management-right user setting unit 28 is provided as an example of a registration unit that registers a second management-right holder, who is a person who has management rights for an operation target.

Note that these processing units are realized by software and hardware resources cooperating with each other. Specifically, these processing units are realized by the CPU 91 (see FIG. 10) loading a program that realizes the user deletion detector 22, the folder detector 23, the management-right user selecting unit 27, and the management-right user setting unit 28 from, for example, the HDD 93 (see FIG. 10) into the main memory 92 (see FIG. 10) and executing the program. In addition, the attribute table memory 21, the policy table memory 25, and the role table memory 26 are realized by, for example, the HDD 93 (see FIG. 10).

Figure 6:
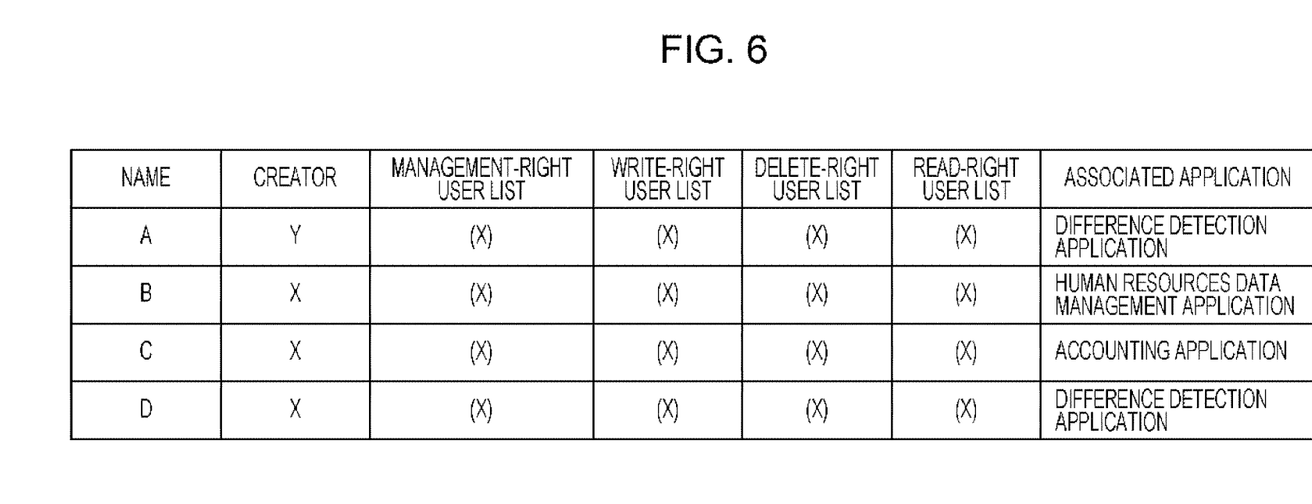
FIG. 6 is a diagram illustrating an example of an attribute table stored in an attribute table memory of the document processing apparatus according to the second exemplary embodiment of the present invention.

FIG. 6 is a diagram illustrating an example of the attribute table stored in the attribute table memory 21 illustrated in FIG. 5. As illustrated in FIG. 6, as attributes of each folder, the attribute table stores a name, a creator, a management-right user list, a write-right user list, a delete-right user list, a read-right user list, and an associated application. Here, a name is a name of a certain folder and a creator is a user who has used an application used to create a certain folder. A management-right user list is a list of users having management rights, which are rights to change access rights (a write right, a delete right, and a read right) for a certain folder. A write-right user list is a list of users having a write right, which is a right to write to a certain folder. A delete-right user list is a list of users having a delete right, which is a right to delete a certain folder. A read-right user list is a list of users having a read right, which is a right to read a certain folder. In addition, an associated application is an application associated with a certain folder.

In addition, each user list includes a user ID as an attribute. Here, the user ID is a user identifier and any one of X, Y, and Z. In the drawing, for example, a user U has a user ID "U", a user V has a user ID "V", and a user list of the users U and V is represented as "(U, V)". For example, for the folder A, it is indicated that the folder A has been created by an application that the user Y uses, the user X has management rights, a write right, a delete right, and a read right for the folder A, and the folder A is associated with a difference detection application.

Figure 7:
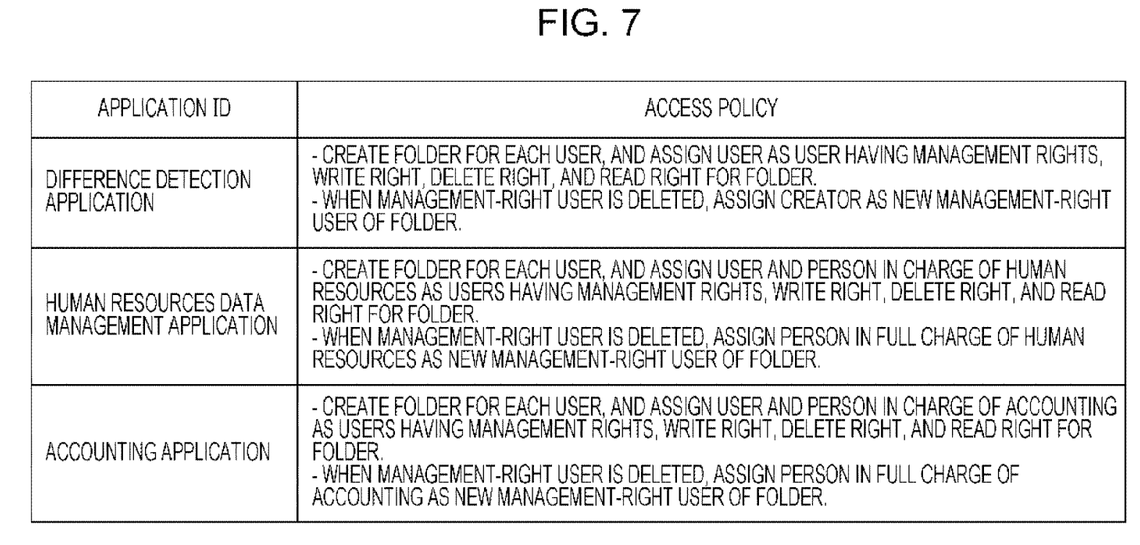
FIG. 7 is a diagram illustrating an example of a policy table stored in a policy table memory of the document processing apparatus according to the second exemplary embodiment of the present invention.

FIG. 7 is a diagram illustrating an example of the policy table stored in the policy table memory 25 illustrated in FIG. 5. As illustrated in FIG. 7, the policy table stores, as attributes, an application ID and an access policy. Here, an application ID is an application identifier and an access policy is a rule for giving an access right, the rule being set for a certain folder by an application.

That is, FIG. 7 indicates that, for example, a folder is created for each user who uses the difference detection application; the user has a write right, a delete right, and a read right for the folder; and when a management-right user of the folder is deleted, the creator is assigned as a management-right user of the folder. Note that, in the drawing, application IDs are represented by names that people may understand; however, the application IDs may also be represented by serial numbers that only computers may understand.

Figure 8:
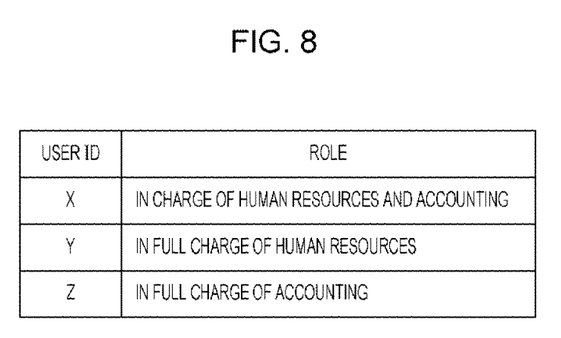
FIG. 8 is a diagram illustrating an example of a role table stored in a role table memory of the document processing apparatus according to the second exemplary embodiment of the present invention.

FIG. 8 is a diagram illustrating an example of the role table stored in the role table memory 26 illustrated in FIG. 5. As illustrated in FIG. 8, the role table stores, as attributes, a user ID and a role. Here, as described above, a user ID is a user identifier and a role is a role played by a certain user such as being in full charge of human resources, being in full charge of accounting, and the like.

That is, FIG. 8 indicates that, as roles, the user X is in charge of human resources and accounting, the user Y is in full charge of human resources, and the user Z is in full charge of accounting. Note that the roles are represented by words in the drawing; however, the roles may also be represented by role codes assigned to the roles.

Next, an operation of the document processing apparatus 20 according to the second exemplary embodiment will be described. Upon detecting deletion of an account of a certain user, the user deletion detector 22 outputs the user ID of the user to the folder detector 23. Then, the folder detector 23 deletes the user ID of the user from a column of creator of the attribute table and from each user list of the attribute table. As a result, the folder detector 23 acquires folder names of all management-right user absence folders having no user IDs from the management-right user list, and outputs the folder names to the management-right user selecting unit 27.

Figure 9:
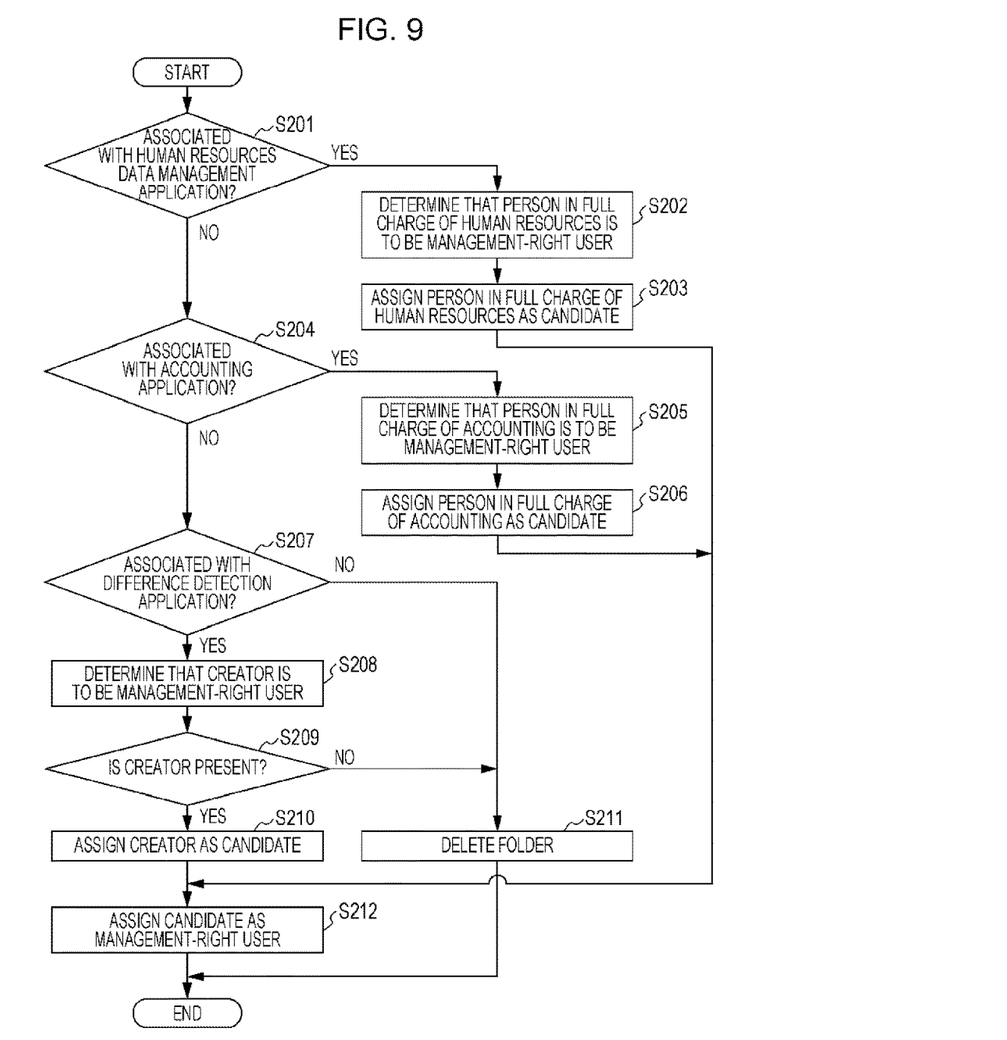
FIG. 9 is a flowchart illustrating an example of an operation of a management-right user selecting unit of the document processing apparatus according to the second exemplary embodiment of the present invention.

Upon receiving the folder names of all the management-right user absence folders from the folder detector 23, the management-right user selecting unit 27 selects a new management-right user for each of the management-right user absence folders. FIG. 9 is a flowchart illustrating an example of an operation of the management-right user selecting unit 27 in this case. That is, the management-right user selecting unit 27 executes an operation illustrated in FIG. 9 for each management-right user absence folder of interest.

As illustrated in FIG. 9, the management-right user selecting unit 27 refers to the attribute table stored in the attribute table memory 21 and determines whether an associated application for a folder of interest is a human resources data management application (step S201). When it is determined that the associated application is a human resources data management application, the management-right user selecting unit 27 refers to the policy table stored in the policy table memory 25 and determines that a person in full charge of human resources is to be a management-right user (step S202). Then, the management-right user selecting unit 27 refers to the role table stored in the role table memory 26 and sets the user ID of a user who is in full charge of human resources as the user ID of a candidate for the management-right user (step S203). As a result, the management-right user selecting unit 27 sets the user ID of the candidate as the user ID of a new management-right user (step S212).

Next, the management-right user selecting unit 27 refers to the attribute table stored in the attribute table memory 21 and determines whether the associated application for the folder of interest is an accounting application (step S204). When it is determined that the associated application is an accounting application, the management-right user selecting unit 27 refers to the policy table stored in the policy table memory 25 and determines that a person in full charge of accounting is to be a management-right user (step S205). Then, the management-right user selecting unit 27 refers to the role table stored in the role table memory 26 and sets the user ID of a user who is in full charge of accounting as the user ID of a candidate for the management-right user (step S206). As a result, the management-right user selecting unit 27 sets the user ID of the candidate as the user ID of a new management-right user (step S212).

Next, the management-right user selecting unit 27 refers to the attribute table stored in the attribute table memory 21 and determines whether the associated application for the folder of interest is a difference detection application (step S207). When it is determined that the associated application is a difference detection application, the management-right user selecting unit 27 refers to the policy table stored in the policy table memory 25 and determines that the creator of the folder of interest is to be a management-right user (step S208). Then, the management-right user selecting unit 27 refers to the attribute table stored in the attribute table memory 21 and determines whether or not the creator of the folder of interest is present even after the folder detector 23 has deleted user IDs from the attribute table (step S209). Here, when it is determined that the creator is present, the management-right user selecting unit 27 sets the user ID of the creator as the user ID of a candidate for the management-right user (step S210). As a result, the management-right user selecting unit 27 sets the user ID of the candidate as the user ID of a new management-right user (step S212). In contrast, when it is determined in step S209 that the creator is absent, the management-right user selecting unit 27 deletes the folder of interest (step S211).

In this manner, when the operation illustrated in FIG. 9 is executed for all the management-right user absence folders, the management-right user selecting unit 27 outputs the user ID of a new management-right user determined for each management-right user absence folder to the management-right user setting unit 28. Then, for each management-right user absence folder in the attribute table illustrated in FIG. 6, the management-right user setting unit 28 stores the user ID of the new management-right user received from the management-right user selecting unit 27.

Here, the above-described operation performed when the user ID of the user X is deleted will be described, in a state in which the attribute table illustrated in FIG. 6 is stored in the attribute table memory 21, the policy table illustrated in FIG. 7 is stored in the policy table memory 25, and the role table illustrated in FIG. 8 is stored in the role table memory 26. In this case, the management-right user of folders A, B, C, and D is the user X in the attribute table illustrated in FIG. 6 and the folders A, B, C, and D are management-right user absence folders. Thus, for each of the folders A, B, C, and D, the operation illustrated in FIG. 9 is executed.

When the operation illustrated in FIG. 9 is executed for the folder A, the management-right user selecting unit 27 determines in step S207 that the associated application is a difference detection application and in step S209 that the creator is present. In step S210, the management-right user selecting unit 27 selects Y as the user ID of the creator and sets Y as the user ID of a candidate. As a result, the management-right user selecting unit 27 sets Y as the user ID of a new management-right user in step S212.

When the operation illustrated in FIG. 9 is executed for the folder B, the management-right user selecting unit 27 determines in step S201 that the associated application is a human resources data management application. In step S203, the management-right user selecting unit 27 selects Y as the user ID of a person in full charge of human resources and sets Y as the user ID of a candidate. As a result, the management-right user selecting unit 27 sets Y as the user ID of a new management-right user in step S212.

When the operation illustrated in FIG. 9 is executed for the folder C, the management-right user selecting unit 27 determines in step S204 that the associated application is an accounting application. In step S206, the management-right user selecting unit 27 selects Z as the user ID of a person in full charge of accounting and sets Z as the user ID of a candidate. As a result, the management-right user selecting unit 27 sets Z as the user ID of a new management-right user in step S212.

When the operation illustrated in FIG. 9 is executed for the folder D, the management-right user selecting unit 27 determines in step S207 that the associated application is a difference detection application and in step S209 that the creator is absent. In step S211, the management-right user selecting unit 27 deletes the folder D.

Note that, in the second exemplary embodiment, a process for deleting a folder is performed as a process performed when a candidate for a management-right user is absent; however, for example, a process for assigning a system administrator as a management-right user may also be performed. Alternatively, which one of the processes is to be performed may also be selected by a user.

In addition, in the second exemplary embodiment, priorities are assigned to applications and a higher priority is given in the order of the human resources data management application, the accounting application, and the difference detection application. The human resources data management application, the accounting application, and the difference detection application are evaluated in this order. However, the order of evaluation is not limited to this. Different priorities may be assigned to the applications and the human resources data management application, the accounting application, and the difference detection application may be evaluated in an order different from the order described above. Alternatively, the order in which the human resources data management application, the accounting application, and the difference detection application are evaluated may be determined by a user and may be changed.

[Hardware Configuration of Computer]

Figure 10:
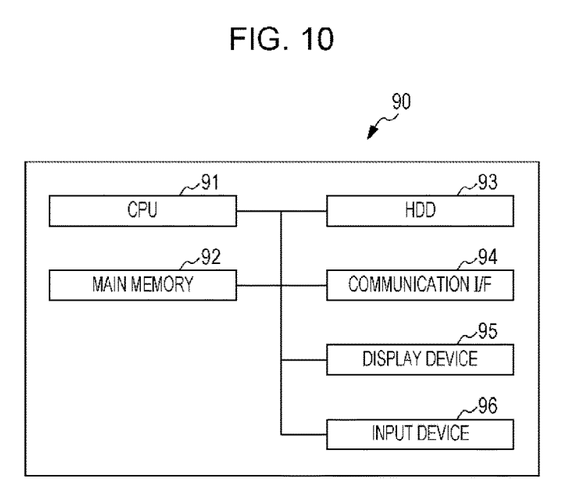
FIG. 10 is a diagram illustrating an example of a hardware configuration of a computer to which an exemplary embodiment of the present invention is applicable.

FIG. 10 is a diagram illustrating an example of a hardware configuration of a computer 90 that realizes the document processing apparatus 10 illustrated in FIG. 1 and the document processing apparatus 20 illustrated in FIG. 5. As illustrated in FIG. 10, the computer 90 includes the CPU 91, the main memory 92, and the HDD 93. The CPU 91 is an arithmetic unit. The main memory 92 is a memory. Here, the CPU 91 executes various types of software programs such as an operating system (OS) and applications, and realizes the above-described processing units. In addition, the main memory 92 stores various types of software programs and data and the like to be used for execution of the software programs. The HDD 93 stores input data for various types of software programs, output data from various types of software programs, and the like. The main memory 92, the HDD 93, or both realize each memory described above. Furthermore, the computer 90 includes a communication interface (I/F) 94 for communicating with external devices, a display device 95 such as a display and the like, and an input device 96 such as a keyboard, a mouse, and the like.

Note that a program that realizes the first exemplary embodiment and a program that realizes the second exemplary embodiment may be, of course, provided by a communication unit and may also be stored in a recording medium such as a CD-ROM and the like and provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An operation target management apparatus comprising:
   at least one hardware processor; and
   a memory storing computer-executable instructions which when executed cause the at least one hardware processor to implement:
      detecting deletion of a first management-right holder, who has been registered as a person having management rights for an operation target, the management rights being rights to manage a plurality of types of operational right;
      determining, in a case where deletion of the first management-right holder is detected, a second management-right holder, who is to newly have management rights for the operation target from among a plurality of operational-right holders by determining that the second management-right holder has a most number of uses of a computer operation performed, among the plurality of operational-right holders, by using at least either an operational right or management rights for at least one of the operation target and another operation target associated with the operation target; and
      registering the second management-right holder as a person having management rights for the operation target.

2. The operation target management apparatus according to claim 1, wherein the computer-executable instructions are further configured to cause the at least one hardware processor to implement determining the second management-right holder from among the plurality of operational-right holders in accordance with priorities of operational rights that each of the plurality of operational-right holders has.

3. The operation target management apparatus according to claim 1, wherein the computer-executable instructions are further configured to cause the at least one hardware processor to implement determining the second management-right holder from among the plurality of operational-right holders in accordance with a history of operational right's use of each of the plurality of operational-right holders.

4. The operation target management apparatus according to claim 2, wherein the computer-executable instructions are further configured to cause the at least one hardware processor to implement determining the second management-right holder from among the plurality of operational-right holders in accordance with a history of operational right's use of each of the plurality of operational-right holders.

5. The operation target management apparatus according to claim 1, wherein the computer-executable instructions are further configured to cause the at least one hardware processor to implement determining that a management-right holder who has management rights for the other operation target is to be the second management-right holder.

6. The operation target management apparatus according to claim 2, wherein the computer-executable instructions are further configured to cause the at least one hardware processor to implement determining that a management-right holder who has management rights for the other operation target is to be the second management-right holder.

7. The operation target management apparatus according to claim 3, wherein the computer-executable instructions are further configured to cause the at least one hardware processor to implement determining that a management-right holder who has management rights for the other operation target is to be the second management-right holder.

8. The operation target management apparatus according to claim 4, wherein the computer-executable instructions are further configured to cause the at least one hardware processor to implement determining that a management-right holder who has management rights for the other operation target is to be the second management-right holder.

9. The operation target management apparatus of claim 1, wherein the computer-executable instructions are further configured to cause the at least one hardware processor to implement:
   detecting whether a write-right user list is empty;
   in response to detecting that the write-right user list is not empty, detecting a number of times the person has performed a write-operation to the operation target, detecting whether a plurality of persons have performed the write-operation to the operation target, and setting the person as the second-management right holder in response to the person being an only candidate to have performed the write-operation to the operation target; and
   in response to detecting that the write-right user list is empty, detecting whether a delete-right user list is empty.

10. The operation target management apparatus of claim 9, wherein the computer-executable instructions are further configured to cause the at least one hardware processor to implement:
   in response to detecting the plurality of persons having performed the write-operation to the operation target, detecting whether the delete-right user list is empty;
   in response to detecting that the delete-right user list is not empty, detecting a number of times the person has performed a delete-operation to the operation target, detecting whether a plurality of persons have performed the delete-operation to the operation target, and setting the person as the second-management right holder in response to the person being an only candidate to have performed the delete-operation to the operation target; and
   in response to detecting that the delete-right user list is empty, detecting whether a read-right user list is empty.

11. The operation target management apparatus of claim 9, wherein the computer-executable instructions are further configured to cause the at least one hardware processor to implement:
   in response to detecting the plurality of persons having performed the delete-operation to the operation target, detecting whether the read-right user list is empty;
   in response to detecting that the read-right user list is not empty, detecting a number of times the person has performed a read-operation to the operation target, detecting whether a plurality of persons have performed the read-operation to the operation target, and setting the person as the second-management right holder in response to the person being an only candidate to have performed the read-operation to the operation target; and in response to detecting that the read-right user list is empty, detecting that the person has a highest job title from among a plurality of users and setting the person as the second-management right holder in response to detecting that the person has the highest job title.

12. The operation target management apparatus according to claim 1, wherein the computer operation is at least one of a write operation, a delete operation and a read operation.

13. The operation target management apparatus according to claim 1, wherein the operation target is a folder and the another operation target is another folder.

14. An operation target management apparatus comprising:

at least one hardware processor; and a memory storing computer-executable instructions which when executed cause the at least one hardware processor to implement:

detecting deletion of a first management-right holder, who has been registered as a person having management rights for an operation target, the management rights being rights to manage a plurality of types of operational right;

determining, in a case where deletion of the first management-right holder is detected, a second management-right holder, who is to newly have management rights for the operation target, in accordance with a policy set for an application program associated with the operation target by determining that the second management-right holder has a most number of uses of a computer operation performed, among a plurality of operational-right holders, by using at least either an operational right or management rights for at least one of the operation target and another operation target associated with the operation target; and registering the second management-right holder as a person having management rights for the operation target.

15. The operation target management apparatus according to claim 14, wherein the computer-executable instructions are further configured to cause the at least one hardware processor to implement determining that, in a case where the application program associated with the operation target is a first application program, a person who plays a role associated with the first application program is to be the second management-right holder, and determining that, in a case where the application program associated with the operation target is a second application program, a person who has created the operation target is to be the second management-right holder.

16. A non-transitory computer readable medium storing a program causing a computer to execute a process, the process comprising:

detecting deletion of a first management-right holder, who has been registered as a person having management rights for an operation target, the management rights being rights to manage a plurality of types of operational right;

determining, in a case where deletion of the first management-right holder is detected, a second management-right holder, who is to newly have management rights for the operation target from among a plurality of operational-right holders by determining that the second management-right holder has a most number of uses of a computer operation performed, among a plurality of operational-right holders, by using at least either an operational right or management rights for at least one of the operation target and another operation target associated with the operation target; and registering the second management-right holder as a person having management rights for the operation target.

17. A non-transitory computer readable medium storing a program causing a computer to execute a process, the process comprising:

detecting deletion of a first management-right holder, who has been registered as a person having management rights for an operation target, the management rights being rights to manage a plurality of types of operational right;

determining, in a case where deletion of the first management-right holder is detected, a second management-right holder, who is to newly have management rights for the operation target, in accordance with a policy set for an application program associated with the operation target by determining that the second management-right holder has a most number of uses of a computer operation performed, among a plurality of operational-right holders, by using at least either an operational right or management rights for at least one of the operation target and another operation target associated with the operation target; and registering the second management-right holder as a person having management rights for the operation target.

18. An operation target management apparatus comprising:

at least one hardware processor; and a memory storing computer-executable instructions which when executed cause the at least one hardware processor to implement:

detecting deletion of a first management-right holder, who has been registered as a person having management rights for an operation target, the management rights being rights to manage a plurality of types of operational right;

determining, in a case where no user is to have the management right for the operation target as a result of the deletion of the first management-right holder, a second management-right holder, who is to newly have management rights for the operation target from among a plurality of operational-right holders by determining that the second management-right holder has a most number of uses of a computer operation performed, among the plurality of operational-right holders, by using at least either an operational right or management rights for at least one of the operation target and another operation target associated with the operation target; and registering the second management-right holder as a person having management rights for the operation target.

19. An operation target management apparatus comprising:

at least one hardware processor; and a memory storing computer-executable instructions which when executed cause the at least one hardware processor to implement:

detecting deletion of a first management-right holder, who has been registered as a person having management rights for an operation target, the management rights being rights to manage a plurality of types of operational right;

determining, in a case where deletion of the first management-right holder is detected, a second management-right holder, who is to newly have management rights for the operation target from among a plurality of operational-right holders by determining that the second management-right holder has a most number of uses, among the plurality of operational-right holders, of at least either an operational right or management rights for at least one of the operation target and another operation target associated with the operation target;

registering the second management-right holder as a person having management rights for the operation target;

detecting whether a write-right user list is empty;

in response to detecting that the write-right user list is not empty, detecting a number of times the person has performed a write-operation to the operation target, detecting whether a plurality of persons have performed the write-operation to the operation target, and setting the person as the second-management right holder in response to the person being an only candidate to have performed the write-operation to the operation target; and in response to detecting that the write-right user list is empty, detecting whether a delete-right user list is empty.

* * * * *